(12) United States Patent
Arico

(10) Patent No.: US 7,306,416 B1
(45) Date of Patent: Dec. 11, 2007

(54) CARGO RESTRAINT DEVICE

(76) Inventor: John Joseph Arico, 1108 Kimberly Ct., Roseville, CA (US) 95661

( * ) Notice: Subject to any disclaimer, the term of this patent is extended or adjusted under 35 U.S.C. 154(b) by 0 days.

(21) Appl. No.: 11/494,152

(22) Filed: Jul. 26, 2006

Related U.S. Application Data

(60) Provisional application No. 60/702,903, filed on Jul. 26, 2005.

(51) Int. Cl.
*B60P 7/08* (2006.01)

(52) U.S. Cl. .................. 410/94; 410/102; 410/121

(58) Field of Classification Search .............. 410/94, 410/95, 90, 91, 102, 121; 248/351, 357; 224/403, 404, 42.33; 296/37.6, 39.2; 280/757–759
See application file for complete search history.

(56) References Cited

U.S. PATENT DOCUMENTS

| | | | |
|---|---|---|---|
| 4,838,745 A | | 6/1989 | Haydock |
| 4,842,460 A | | 6/1989 | Schlesch |
| 5,655,863 A | * | 8/1997 | Mundt ..................... 410/94 |
| 5,657,916 A | * | 8/1997 | Tackett |
| 6,012,885 A | | 1/2000 | Taylor et al. |
| 6,702,532 B1 | | 3/2004 | Throener |

* cited by examiner

*Primary Examiner*—Stephen Gordon
(74) *Attorney, Agent, or Firm*—Kenneth A. Roddy

(57) ABSTRACT

A cargo restraint device for resisting movement of cargo items on a vehicle floor or cargo bed has a generally flat octagonal or rectangular base with a slip-resistant bottom surface to be supported on the floor or bed and a top surface for receiving at least a portion of a cargo item, and a hollow upright upper body portion that can be filled with heavy material such as sand to provide weight. The upper body portion has at least two upright members extending upwardly from the base member, each having outer surfaces for abutting the cargo item, and at least one having an aperture for receiving straps to encircle a cargo item held by the device. In one embodiment four upright members intersect at a center portion in a cross-shaped configuration. In another embodiment two upright members intersect at a center portion in an L-shaped configuration.

8 Claims, 2 Drawing Sheets

CARGO RESTRAINT DEVICE

CROSS REFERENCE TO RELATED APPLICATION

This application claims priority of U.S. Provisional Patent Application Ser. No. 60/702,903, filed Jul. 26, 2005.

BACKGROUND OF THE INVENTION

1. Field of the Invention

This invention relates generally to load holding devices, and more particularly to a cargo restraint device for the cargo bed of a vehicle that is removably supported on the bed to engage and restrain the cargo against sliding and movement.

2. Background Art

The problem of sliding and movement exists when transporting items in the cargo area of vehicles, such as automobile trunks, the bed of pickup trucks, and cargo areas of SUV's, delivery trucks, boats, airplane freight areas, etc. Typically, the items that are being transported are covered or contained in cellulose cardboard or paper bags or packages, or plastic bags, which do not provide appreciable resistance against sliding relative to the surface of the cargo area. Although some vehicles provide tie-downs for elastic holding straps and barricade surfaces, the items are still prone to skidding, sliding, or tipping over.

Throener, U.S. Pat. No. 6,702,532 discloses a cargo restraining device having an upper block portion for abutting and holding the cargo in place and a lower planar base portion which is held in place by the cargo. The base includes a reinforcement member embedded, inserted, or molded into a flexible material and designed to provide a rigid structure with a coefficient of friction higher than most packaging material. The base and/or upper block portion may be comprised of rigid material and the bottom surface of the base may consist of a softer flexible material attached thereto by molding, adhesion, welding, or other attachment means to enhance adhesion or grip to the surface supporting the cargo holding device and cargo.

Taylor et al, U.S. Pat. No. 6,012,885 discloses a cargo chock for a cargo bed which has a corrugated liner defining channels and ridges. The chock includes a base having a top with a planar area and a bottom with alternating channels and ridges that mate with the liner of the cargo bed. An upstanding ridge in the form of a cross is arranged on the top and includes sides which are normal to the planar area of the top and an upper surface that includes an apex from which the elements of the cross extend downwardly toward the ends thereof. The elements of the cross are aligned parallel to and perpendicular to the channels of the bed, respectively. The element lying parallel to the channels of the cargo bed is displaced laterally to create additional adjustment capability.

Schlesch, U.S. Pat. No. 4,842,460 discloses a releasable cargo anti-skid block for gripping the cargo bed of a vehicle which comprises a rigid body having a cargo engageable upstanding side and a cargo bed engageable bottom. The bottom and upstanding side join at a corner edge. Gripping apparatus on the bottom of the body extends lengthwise along the bottom. The gripping apparatus are fixed with respect to the body for forcibly but releasably gripping the surface of the cargo bed of the vehicle.

Haydock, U.S. Pat. No. 4,838,745 discloses a space divider trunk organizer for partitioning a surface and for restraining items located thereon against movement which comprises a block of foam rubber covered by a rubber coating and the hook portion of a hook and loop fastener for securing the space divider to a fibrous mat located on a floor of an automobile trunk. The space divider may be of any shape and the loop portion of a hoop and loop fastener may be affixed to the top of the space divider to provide the ability to stack a plurality of dividers like building blocks around an item to be secured against movement within the trunk.

The present invention is distinguished over the prior art in general, and these patents in particular by a cargo restraint device for resisting movement of cargo items on a vehicle floor or cargo bed, which has a generally flat octagonal or rectangular base member and a hollow upright upper body portion which can be filled with sand or other heavy material to increase its weight. The base member has a slip-resistant textured bottom surface to be supported on the floor or bed and a top surface for receiving at least a portion of a cargo item. The upper body portion has at least two generally rectangular upright members extending upwardly from the base member, each having outer surfaces for abutting the cargo item. The upright members are provided with apertures for receiving straps to encircle a cargo item held by the device.

In a first embodiment, there are four upright members that extend upwardly from the base member and inwardly from the outer periphery thereof and intersect at a center portion to define a generally cross-shaped configuration when viewed from the top. In a second embodiment, there are two upright members that extend upwardly from the outer periphery of two adjacent sides of the base member top surface and intersect at a center portion to define a generally L-shaped configuration when viewed from the top.

SUMMARY OF THE INVENTION

It is therefore an object of the present invention to provide a cargo restraint device that can be easily and quickly installed on a variety of different surfaces, and easily removed therefrom for use with other vehicles, or to be stored.

It is another object of this invention to provide a cargo restraint device that has an upper body portion for abutting and holding a cargo item in place and a flat base member which is held in place by the cargo item.

Another object of this invention is to provide a cargo restraint device that has a flat base member which is held in place by the cargo item and has a textured bottom surface that significantly reduces slippage relative to the surface supporting the cargo holding device and cargo.

Another object of this invention is to provide a cargo restraint device that has a flat base member with a textured bottom surface and a hollow upper body portion which can be filled with sand or other heavy material to increase its weight and significantly reduce slippage relative to the surface supporting the cargo holding device and cargo.

Another object of this invention is to provide a cargo restraint device that has an upper body portion with at least two generally rectangular upstanding members extending upwardly from a flat base member, each having outer surfaces for abutting the cargo item.

A further object of this invention is to provide a cargo restraint device that has an upper body portion with at least two upstanding upright members extending upwardly from a flat base member, each having outer surfaces for abutting the cargo item and provided with apertures for receiving straps to encircle a cargo item held by the device.

A still further object of this invention is to provide a cargo restraint device that is simple in construction, inexpensive to manufacture, and rugged and reliable in use.

Other objects of the invention will become apparent from time to time throughout the specification and claims as hereinafter related.

The above noted objects and other objects of the invention are accomplished by a cargo restraint device for resisting movement of cargo items on a vehicle floor or cargo bed, which has a generally flat octagonal or rectangular base member and a hollow upright upper body portion which can be filled with sand or other heavy material to increase its weight. The base member has a slip-resistant textured bottom surface to be supported on the floor or bed and a top surface for receiving at least a portion of a cargo item. The upper body portion has at least two generally rectangular upright members extending upwardly from the base member, each having outer surfaces for abutting the cargo item. The upright members are provided with apertures for receiving straps to encircle a cargo item held by the device.

In a first embodiment, there are four upright members that extend upwardly from the base member and inwardly from the outer periphery thereof and intersect at a center portion to define a generally cross-shaped configuration when viewed from the top. In a second embodiment, there are two upright members that extend upwardly from the outer periphery of two adjacent sides of the base member top surface and intersect at a center portion to define a generally L-shaped configuration when viewed from the top.

DESCRIPTION OF THE PREFERRED EMBODIMENTS

Figure 1:
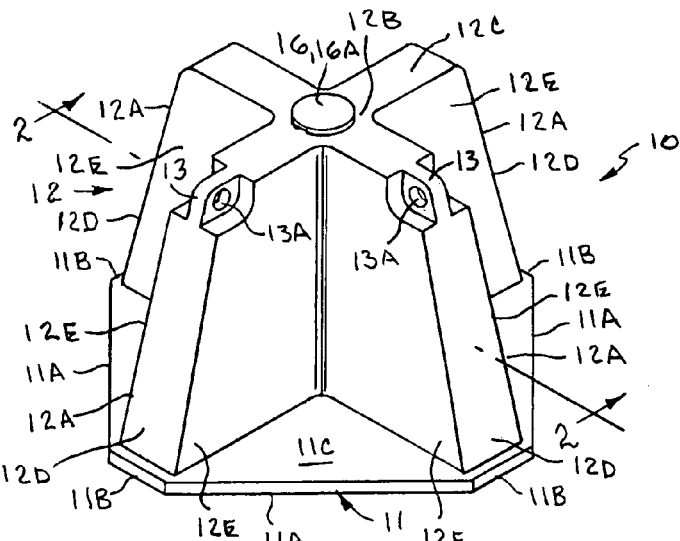
FIG. 1 is a perspective view of the cargo restraint device in accordance with the present invention.
Figure 2:
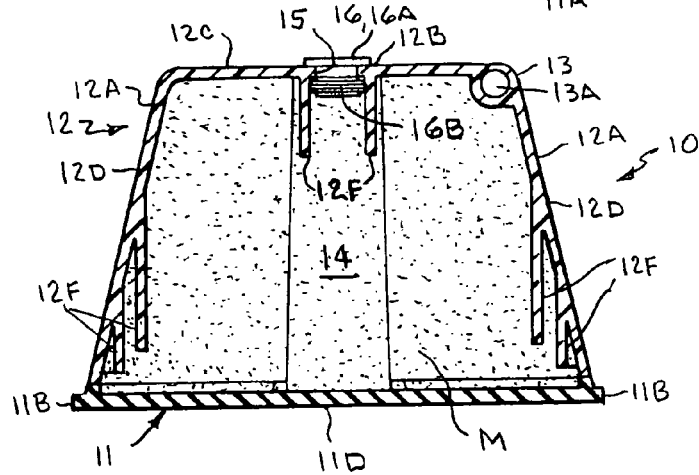
FIG. 2 is a cross sectional view of the cargo restraint device, taken along line 2-2 of FIG. 1.
Figure 3:
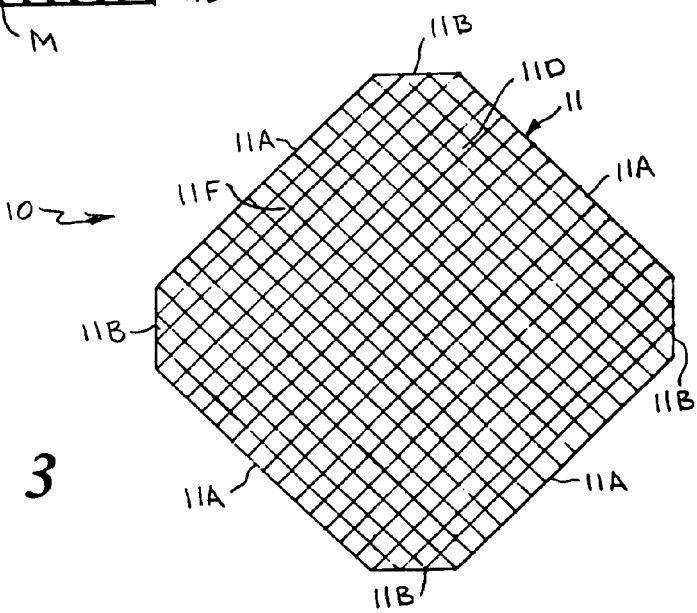
FIG. 3 is a bottom plan view of the cargo restraint device.

Referring to the drawings by numerals of reference, there is shown in FIGS. 1, 2 and 3, a cargo restraint device 10 in accordance with the present invention. The cargo restraint device 10 has a generally flat rectangular or octagonal base member 11 and an upright upper body portion 12. The base member 11 has four opposed parallel longer sides 11A and four opposed parallel shorter sides 11B defining the octagonal configuration. The base member 11 has a generally flat top surface 11C and a bottom surface 11D that is provided with a textured surface 11F, shown schematically in FIG. 3, which is configured to increase its frictional engagement with the surface on which it is supported and its effectiveness in preventing relative sliding movement therebetween.

In a preferred embodiment, the base member 11 is formed of rubber and the upper body portion 12 is formed of ABS material, but not limited thereto, and are bonded or otherwise secured together by conventional means to form an integral unit. It should be understood that base member 11 and the upper body portion 12 may be formed of the same or different materials bonded or otherwise secured together by conventional means to form an integral unit.

The upright upper body portion 12 of the cargo restraint device 10 has four generally rectangular hollow upright members 12A that extend upwardly from the top surface 11C of the base member 11 and inwardly from the outer periphery thereof and intersect at a center portion 12B, to define a generally cross-shaped configuration when viewed from the top. Each upright member 12A has a contiguous cross-shaped common top wall 12C that extends horizontally outwardly a short distance from the center portion 12B, an outer wall 12D that extends angularly upward and inward from a respective shorter side 11B of the base member 11, and opposed side walls 12E that adjoin the top wall 12C and outer wall 12D.

In a preferred embodiment, the upper end of the outer wall 12D of one or more of the upright members 12A has a reduced width portion 13 at its intersection with the top wall 12C with a transverse eyelet or aperture 13A extending therethrough, through which tie-down straps or elastic straps such as "bungee cords" maybe installed to encircle an item held by the restraint device.

As shown in FIG. 2, the base member 11 is secured to the bottom end of the upper body portion 12 to define an enclosed interior cavity 14. The interior surfaces of the walls of the upper body portion may be provided with reinforcing ribs or walls 12F to facilitate molding and to strengthen the structure, if required.

The top wall 12C is provided with an opening 15 at its center, and a removable cap or plug 16 having a flange 16A at its top end and a reduced diameter body portion 16B with parallel spaced circumferential protrusions is frictionally engaged in the opening by pressing it into the opening. The underside of the flange 16A of the cap or plug 16 may be provided with a shallow radial slot to receive a tool such as the blade of a screwdriver or other suitable tool, to facilitate prying it off if necessary to remove the cap or plug.

Prior to installing the cap or plug 16, the hollow interior cavity 14 is filled with sand or other heavy material to provide weight and to increase the frictional engagement of the bottom surface of the base member 11 with the surface on which it is supported and its effectiveness in preventing relative sliding movement therebetween.

Figure 4:
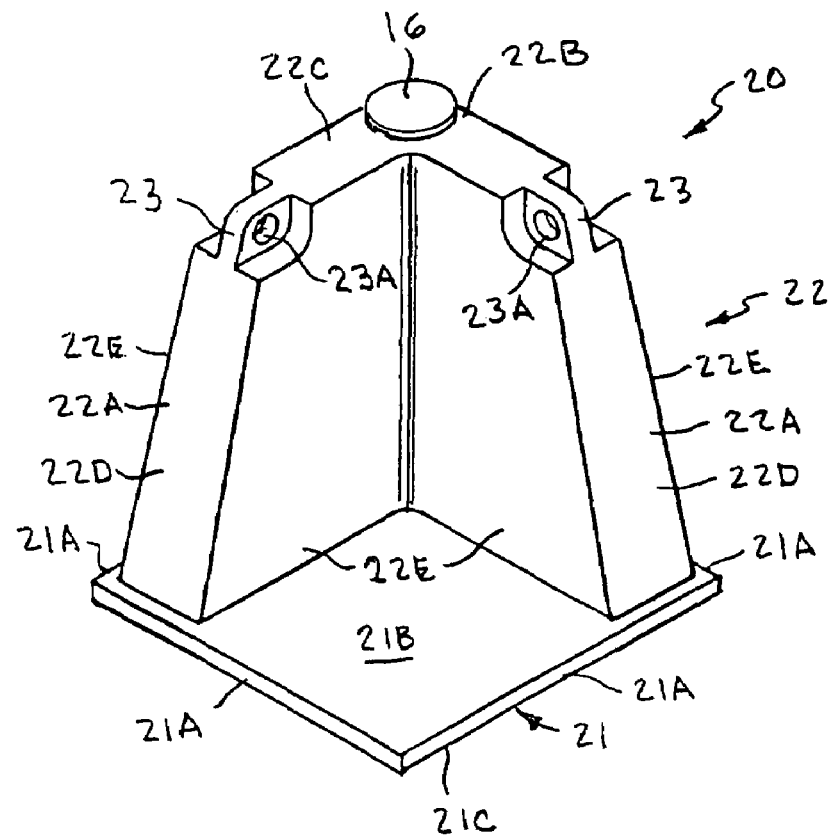
FIG. 4 is a perspective view of a second embodiment of the cargo restraint device in accordance with the present invention.
Figure 5:
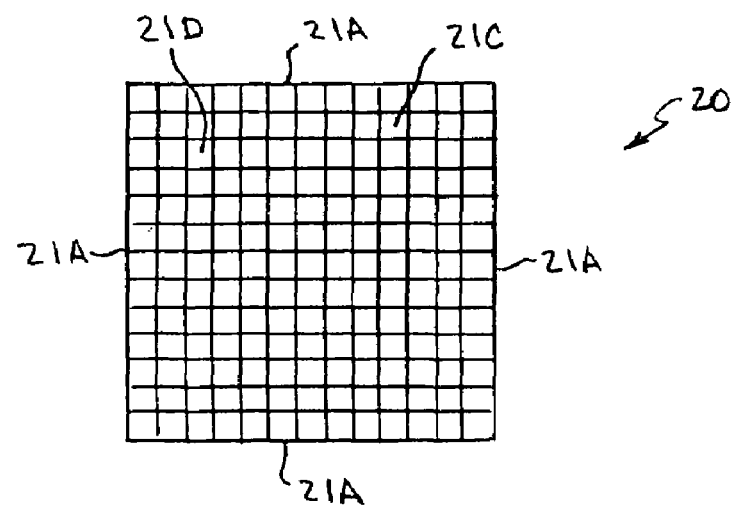
FIG. 5 is a bottom plan view of the cargo restraint device of FIG. 4.

Referring now to FIGS. 4 and 5, there is shown a second embodiment of the cargo restraint device 20. The cargo restraint device 20 has a generally flat rectangular base member 21 having four opposed parallel sides 21A and an upright upper body portion 22. The base member 21 has a generally flat top surface 21B and a bottom surface 21C that is provided with a textured surface 21D which is configured to increase its frictional engagement with the surface on which it is supported and its effectiveness in preventing relative sliding movement therebetween.

The upright upper body portion 22 of the cargo restraint device 20 has two generally rectangular hollow upright members 22A that extend upwardly from the top surface 21C of the base member 21 along two adjacent sides and intersect at a center portion 22B, to define a generally L-shaped configuration when viewed from the top. Each upright member 22A has an adjoined common top wall 22C that extends horizontally outwardly a short distance from the center portion 22B, an outer wall 22D that extends angularly upward and inward from an outer side 21A of the base member 21, and opposed side walls 22E that adjoin the top wall 22C and outer wall 22D.

As with the previous embodiment, the upper end of the outer wall 22D of at least one of the upright members 22A preferably has a reduced width portion 23 at its intersection with the top wall 22C with a transverse eyelet or aperture 23A extending therethrough, through which tie-down straps or elastic straps, such as "bungee cords" maybe installed to encircle an item held by the restraint device.

Also as shown and described previously, the base member 21 is secured to the bottom end of the upper body portion 22 to define an enclosed interior cavity, which may be filled with sand or other heavy material, and the top wall 22C is provided with an opening at its center, and a removable cap or plug 16, as described previously, is frictionally engaged in the opening by pressing it into the opening.

In use, the cargo item(s), or a portion thereof is placed onto the base 11 or 21 abutting the outer surface of one or more walls of the upright members 12A, 22A of the upper body 12, 22, of the cargo restraining device 10, 20. The cargo item to be restrained is placed at least partially on the base member 11, 12, so that the weight of the item exerts a force onto the base for holding the restraint device and cargo item in place. One or more cargo restraining devices 10, 20 may used to hold an item against a side wall of a vehicle bed or floor, or a plurality of the devices 10, 20, may be placed around the corners of a container. When filled with sand or other heavy material, the weight of the device is increased to increase the frictional engagement of the bottom surface of the base member 11, 21 with the surface on which it is supported and its effectiveness in preventing relative sliding movement therebetween.

While this invention has been described fully and completely with special emphasis upon preferred embodiments, it should be understood that within the scope of the appended claims the invention may be practiced otherwise than as specifically described herein.

The invention claimed is:

1. A cargo restraint device for resisting movement of cargo items on a vehicle floor or cargo bed surface, comprising:
   a cargo restraint device having a generally flat base member having a generally octagonal configuration with four opposed parallel longer sides and four opposed parallel shorter sides, a textured slip-resistant bottom surface adapted to be supported on the vehicle floor or cargo bed surface and a top surface for receiving at least a portion of a cargo item;
   a hollow upright upper body portion enclosed at a bottom end by said base member including four generally rectangular hollow upright members that extend upwardly from the top surface of said base member and inwardly from the outer periphery thereof and intersect at a center portion in a generally cross-shaped configuration as seen from the top defining an interior cavity for receiving a heavy material;
   each said upright member having a common top wall that extends horizontally outwardly a distance from said center portion in a contiguous cross shape, an outer wall that extends angularly upward and inward from a respective said shorter side of said base member, and opposed side walls that adjoin said common top wall and said outer wall for abutting the cargo item;
   an opening in communication with said interior cavity for introducing the heavy material into said cavity to provide weight and increase the frictional engagement of said base member bottom surface with the vehicle floor or cargo bed surface on which it is supported and resistance to relative sliding movement therebetween; and
   a closure member removably engaged with said opening.

2. A cargo restraint device for resisting movement of cargo items on a vehicle floor or cargo bed surface, comprising:
   is a cargo restraint device having a flat generally rectangular base member with four opposed parallel sides, a textured slip-resistant bottom surface adapted to be supported on the vehicle floor or cargo bed surface, and a top surface for receiving at least a portion of a cargo item;
   a hollow upright upper body portion enclosed at a bottom end by said base member including two generally rectangular hollow upright members that extend upwardly from two adjacent sides of said base member top surface and intersect at a center portion in a generally L-shaped configuration as seen from the top defining an interior cavity for receiving a heavy material;
   each said upright member having a common flat top wall that extends horizontally outwardly a distance from said center portion in a continuous L shape, an outer wall that extends a short distance vertically upward from a respective outer side of said base member, and opposed side walls that adjoin said common top wall and said outer wall for abutting the cargo item;
   an opening in communication with said interior cavity for introducing the heavy material into said cavity to provide weight and increase the frictional engagement of said base member bottom surface with the vehicle floor or cargo bed surface on which it is supported and resistance to relative sliding movement therebetween; and
   a closure member removably engaged with said opening.

3. The cargo restraint device according to claim 1, further comprising:
   an aperture extending transversely through at least one of said upright members sized and shaped to receive tie-down straps or elastic straps, for encircling a cargo item held by said restraint device.

4. A cargo restraint device for resisting movement of cargo items on a vehicle floor or cargo bed surface, comprising:
   a cargo restraint device having a generally flat base member having a generally octagonal configuration with four opposed parallel longer sides and four opposed parallel shorter sides, a textured slip-resistant bottom surface adapted to be supported on the vehicle floor or cargo bed surface and a top surface for receiving at least a portion of a cargo item;
   a hollow upright upper body portion enclosed at a bottom end by said base member including four generally rectangular hollow upright members that extend upwardly from the top surface of said base member and inwardly from the outer periphery thereof and intersect at a center portion in a generally cross-shaped configuration as seen from the top defining an interior cavity for receiving a heavy material;
   each said upright member having a common top wall that extends horizontally outwardly a distance from said center portion in a contiguous cross shape, an outer wall that extends angularly upward and inward from a respective said shorter side of said base member, and opposed side walls that adjoin said common top wall and said outer wall for abutting the cargo item;
   a of heavy material in said cavity to provide weight and increase the frictional engagement of said base member bottom surface with the vehicle floor or cargo bed surface on which it is supported and resistance to relative sliding movement therebetween; and an opening in communication with said interior cavity for introducing or removing said heavy material, and a closure member removably engaged with said opening.

5. A cargo restraint device for resisting movement of cargo items on a vehicle floor or cargo bed surface, comprising:

is a cargo restraint device having a flat generally rectangular base member with four opposed parallel sides, a textured slip-resistant bottom surface adapted to be supported on the vehicle floor or cargo bed surface, and a top surface for receiving at least a portion of a cargo item;

a hollow upright upper body portion enclosed at a bottom end by said base member including two generally rectangular hollow upright members that extend upwardly from two adjacent sides of said base member top surface and intersect at a center portion in a generally L-shaped configuration as seen from the top defining an interior cavity for receiving a heavy material;

each said upright member having a common flat top wall that extends horizontally outwardly a distance from said center portion in a contiguous L shape, an outer wall that extends a short distance vertically upward from a respective outer side of said base member, and opposed side walls that adjoin said common top wall and said outer wall for abutting the cargo item;

a heavy material in said cavity to provide weight and increase the frictional engagement of said base member bottom surface with the vehicle floor or cargo bed surface on which it is supported and resistance to relative sliding movement therebetween; and an opening in communication with said interior cavity for introducing or removing said heavy material, and a closure member removably engaged with said opening.

6. The cargo restraint device according to claim 4, further comprising:

an aperture extending transversely through at least one of said upright members sized and shaped to receive tie-down straps or elastic straps, for encircling a cargo item held by said restraint device.

7. The cargo restraint device according to claim 2, further comprising:

an aperture extending transversely through at least one of said upright members sized and shaped to receive tie-down straps or elastic straps, for encircling a cargo item held by said restraint device.

8. The cargo restraint device according to claim 5, further comprising:

an aperture extending transversely through at least one of said upright members sized and shaped to receive tie-down straps or elastic straps, for encircling a cargo item held by said restraint device.

* * * * *